April 19, 1966  D. A. VAN SCOY  3,246,355
PIPE LINE APPARATUS
Filed Feb. 25, 1963  2 Sheets-Sheet 2
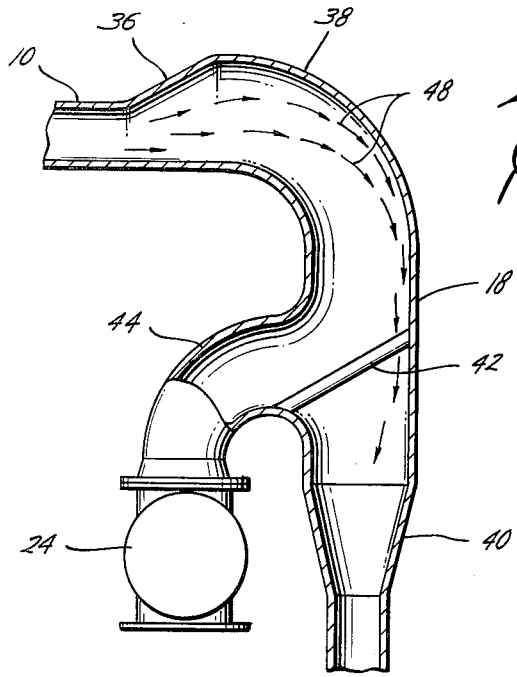
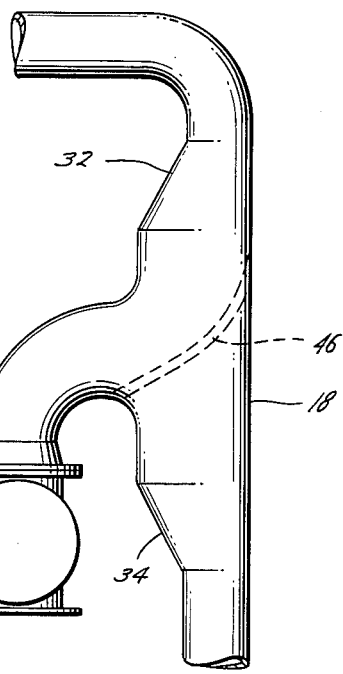
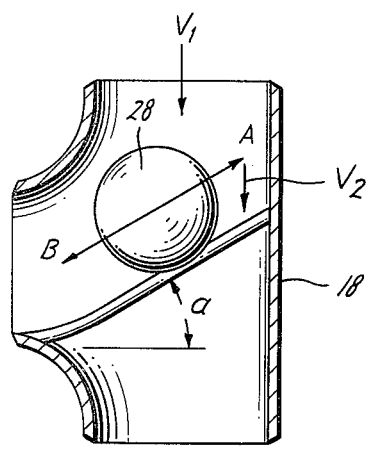
Davis A. Van Scoy
INVENTOR.
BY
ATTORNEY United States Patent Office 3,246,355
Patented Apr. 19, 1966

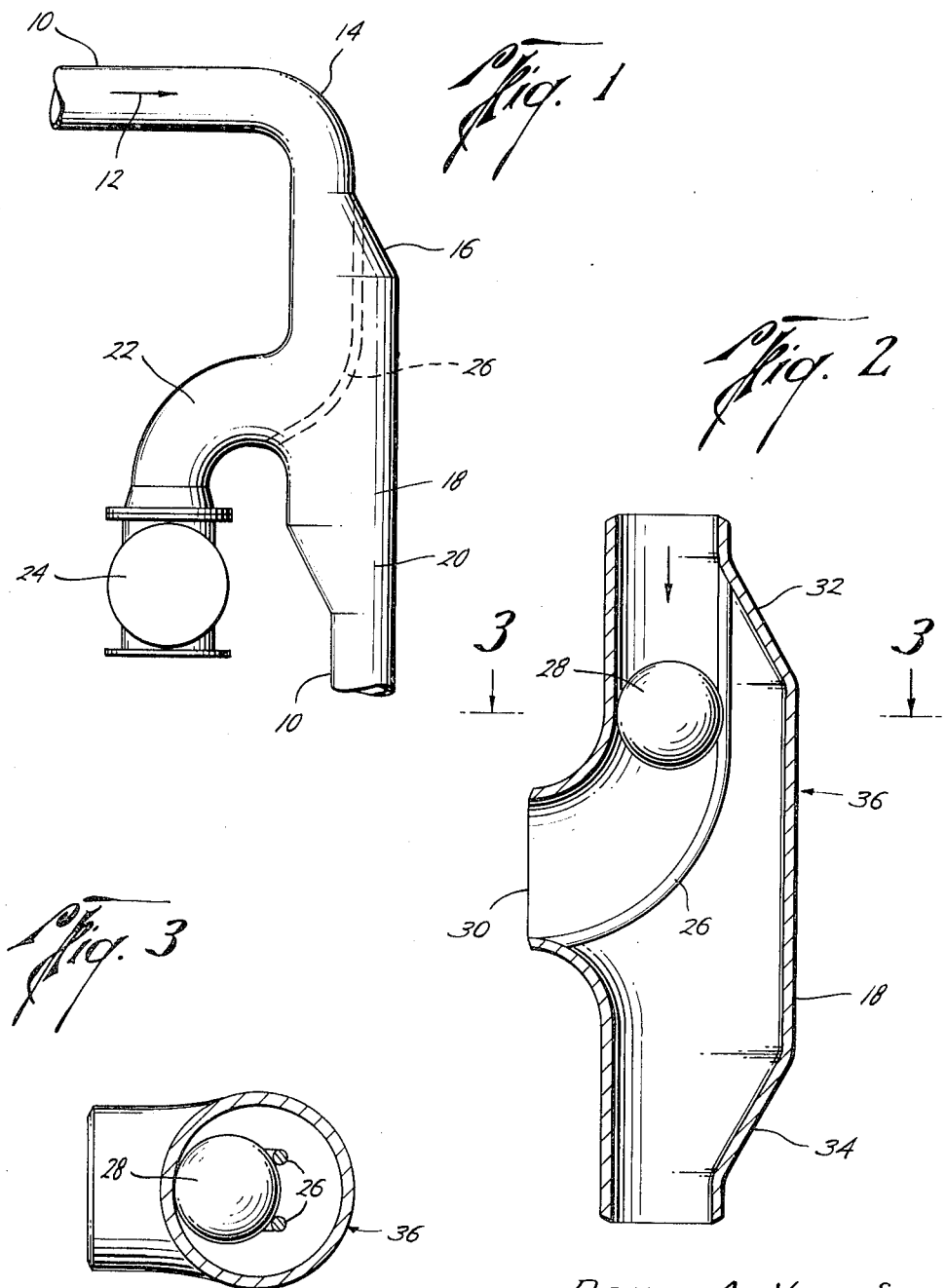

3,246,355
PIPE LINE APPARATUS
Davis A. Van Scoy, Houston, Tex., assignor, by mesne assignments, to Helmerich & Payne, Inc., Tulsa, Okla., a corporation of Delaware
Filed Feb. 25, 1963, Ser. No. 260,656
12 Claims. (Cl. 15—104.06)

This invention relates to pipeline apparatus and more particularly it relates to improvements in pipelines whereby objects moved through the pipeline, such as for example various plugs of spherical, cylindrical or other shapes, may be readily removed from the pipeline.

In the pipeline industry movable plugs are used in pipelines for various purposes, including for example the separation of sequential different fluids in the pipeline, for the application of coatings to the inside of the pipeline, for cleaning the line, and for measuring the rate of flow through the line. Such plugs may be of various shapes including cylindrical, spherical, and spheroidal shapes. More recently the spherical shape has been preferred. The plug has a relatively close fit in the pipeline and is impelled through the line by the fluid flowing therethrough.

When the portion of the line through which the plug is being used has been traversed by the plug it is necessary to provide means for separating the plug from the pipeline. Usually such means comprises a T or a Y in the pipeline with bars across the line to cause the plug to be diverted into an intersecting line. Usually a valve, such as for example the ball valve shown in my copending application Serial No. 195,502 filed May 17, 1962, and now abandoned, is provided in the intersecting line for removal of the plug therefrom.

During its movement through the pipeline the plug will usually carry ahead of it dirt, scale and other trash picked up in the line. It is essential that such dirt and trash be prevented from going to the valve, because of the likelihood of damage to the valve. Heretofore it has been the practice to depend upon the flowing fluid to carry the trash past the opening into the intersecting line, but inevitably some of this trash has been diverted and settled down into the valve.

It is an object of this invention to provide apparatus by means of which a plug may be diverted from the pipeline while insuring that substantially all trash particles continue on through the pipeline. Another object is to provide means to insure that the plug is moved into the intersecting line.

This invention broadly comprises the provision of apparatus for effecting the removal of a movable plug from a pipeline through which a fluid under pressure is flowing, wherein a downwardly directed, preferably vertical, enlarged cross-section portion is provided in the pipeline, and wherein an intersecting plug exit line through which the plug is removed intersects this enlarged portion. Bars or other permeable means traverse the enlarged portion of the pipeline just below the opening into the intersecting line to prevent the plug from being carried further in the pipeline. The cross-sectional area of the enlarged portion is preferably designed to exceed the cross-sectional area of the movable plug by an amount sufficient to insure that the forces acting upon the plug and tending it to move into the plug exit are substantially greater than the forces which tend to hold the plug in the enlarged fluid passage.

For a better understanding of the invention reference is now made to the accompanying drawings wherein:

FIGURE 1 is a sectional view of one embodiment of this invention shown in conjunction with associated equipment;

FIGURE 2 is an enlarged sectional view of another embodiment of this invention;

FIGURE 3 is a cross-sectional view of the embodiment of FIGURE 2 taken at line 3—3 of FIGURE 2;

FIGURE 4 is a view similar to FIGURE 1 of another embodiment of the invention;

FIGURE 5 is a view similar to FIGURE 1 of still another embodiment; and

FIGURE 6 is an enlarged cross-sectional view of a portion of the embodiment shown in FIGURE 4.

FIGURE 1 portrays a pipeline 10 in which the direction of fluid flow is as indicated by the arrow 12. As shown in this figure the pipeline is substantially horizontal and has attached thereto an elbow 14 extending vertically downwardly. The outlet of the elbow in turn communicates with an eccentric reducer 16 which is connected to an enlarged T 18. The downstream port of the T 18 is connected to another eccentric reducer 20 which in turn communicates with a continuation of the pipeline 10. The horizontal part of the T is connected to an elbow 22 which leads to a valve 24. The two eccentric reducers 16 and 20 together with the in-line portion of the T 18 comprise an enlarged cross-section portion of the pipeline and the other port of the T together with the elbow 22 comprise an exit passage for a movable plug. At least one and preferably two or more guide bars 26 within the T and the eccentric reducer 16 comprise means for guiding a plug into the plug exit passage. The guide bars are spaced apart to allow fluid to flow between them but are positioned closely enough together that a plug of a size to fit closely within the pipeline 10 cannot pass between them.

FIGURE 2 shows a slight modification of this invention and shows a movable plug, in this case a sphere 28, passing through the enlarged portion of the pipeline and moving toward the outlet 30 which leads into the plug exit passage. It will be noted that in the embodiment shown in FIGURE 2 the eccentric reducers 32 and 34 are oriented so that the outlet from the enlarged portion is axially aligned with the inlet thereto, whereas in the embodiment shown in FIGURE 1 the outlet is not aligned with the inlet but is eccentrically disposed with relation thereto.

In the embodiment shown in FIGURE 2 the sphere 28 has been forced through the pipeline by the fluid flowing therethrough and has entered the enlarged portion 36 of the pipeline. Since this portion of the pipeline has a larger cross-sectional area the fluid velocity is substantially reduced and therefore the momentum of the sphere 28 declines rapidly. By means of the guide bars 26 the sphere 28 is prevented from continuing on through the enlarged portion but instead tends to be diverted therefrom toward the outlet 30.

FIGURES 4 and 5 disclose modifications of the invention wherein the elements of the apparatus are arranged somewhat differently and wherein different shapes of guide bars are provided. In the embodiment shown in FIGURE 4 an eccentric reducer 36 is placed in the horizontal portion of the pipeline 10. An enlarged downwardly turned elbow 38 is attached to the reducer 36, and an enlarged T 18 is connected to the elbow 38. In this embodiment a concentric reducer 40 connects to the downwardly directed fluid outlet of the T 18. Guide bars 42 traverse the fluid passage of the T immediately adjacent the downstream side of the intersection of the plug exit passage, which exit passage comprises a downwardly turned elbow 44, to which is attached a valve 24. In this embodiment the guide bars 42 are straight, and traverse the fluid passage at an angle of about 30° to the horizontal.

The embodiment shown in FIGURE 5 is similar to that of FIGURE 2, except that the eccentric reducers 32 and 34 are turned 180° from their FIGURE 2 position. In this embodiment, guide bars 46 may be straight, as in the FIGURE 4 embodiment, or may have an upward curve at the end opposite the intersecting plug exit passage.

An important feature of this invention is the provision of means to substantially prevent trash carried in front of the sphere or other movable plug from being carried out of the flow path with the plug when the plug is diverted therefrom. Heretofore such plugs have been diverted from a horizontal portion of the pipeline, and the plug was dropped out of the flow path by gravity, or by a combined force of gravity and momentum. Inevitably, in such cases, large quantities of trash were also diverted and carried to the valve used to remove the sphere from the pipeline, so that such trash had a highly deleterious effect on the valve.

According to the present invention, the sphere or other movable plug is removed from a vertical, or at least downwardly directed, portion of the pipeline, which portion is immediately preceded by an elbow turned in such a position that centrifugal force acting on the trash particles flowing through the elbow causes the particles to tend to move to one side of the downwardly directed portion of the pipeline, as indicated by the arrows 48 in FIGURE 4. The plug exit portion intersects this downwardly directed portion of the pipeline on the opposite side, so that the particles flow past the intersection and have little or no tendency to be diverted with the plug.

In such an installation, it is essential that the downwardly directed portion be substantially larger than the movable plug, at least that portion which is opposite and directly above the intersection. Such enlargement is required for several reasons, one of which is the necessity for reducing the flow velocity so that the plug will not hit the guide bars at a high rate of speed. Furthermore, it is necessary to provide a flow path around the sphere when it is stopped by the guide bars. In addition, such enlargement allows the plug exit passage intersection to be placed further away from the flow path of the trash particles.

An important reason for such enlargement of the downwardly-directed portion adjacent the intersection of the plug exit derives from the necessity of insuring that the plug is promptly diverted from the flow path into the intersecting line. I have found that in many cases the plug is not diverted. I have therefore devised means to insure that the plug is always properly diverted. I have found that if this downwardly directed portion of the line adjacent the intersection is not properly designed, the flow of fluid past the plug causes a lift force to be exerted on the plug, which force tends to prevent the plug from moving into the intersecting line. In some instances it has been found that a plug which had already been diverted into the intersecting line was pulled back out of this line by these lift forces.

I have now devised a design by means of which the forces tending to cause the plug to be diverted exceed the forces tending to prevent such diversion by an amount sufficient to insure that the plug is always moved into the intersecting line. These forces include dynamic forces and, in some instances, the force of gravity.

When a plug, such as a sphere for example, is moved into contact with the guide bars, it momentarily becomes stationary. At this moment, e.g. in the position of the sphere 28 shown in FIGURE 6, the sphere is acted on by a force A, which tends to move it in the direction of the arrow A in FIGURE 6, and by a force B, which tends to move it in the direction of the arrow B in FIGURE 6. Force A is the component parallel to the guide bars 42 of the dynamic lift force exerted upon the sphere by the fluid flowing past it, and force B is the component parallel to the guide bars 42 of the total of the effective weight of the sphere and the dynamic drag force exerted upon it by the flowing fluid. It is apparent from the foregoing discussion that in order for the sphere to be diverted into the intersecting line the force B must exceed the force A. As a practical matter, however, it has been found that this is not enough, and in order to insure that the sphere is diverted, the ratio $B/A$, as determined by the method described herein, must be at least about 1.75.

The lift force may be calculated in either of two ways. One of these methods takes into consideration the viscosity of the flowing fluid while the other does not. It has been found, however, that changes in the fluid viscosity affect the drag to a greater extent than the lift, therefore if the viscosity is ignored in calculating lift, a factor of safety is provided. Since little data is available on the effect of viscosity on the lift characteristics of spheres, cylinders, and other shapes used in pipelines, it is preferred to use the method which ignores viscosity. The spheres used for pipeline purposes have quite smooth walls, so that the surface roughness effects can usually be ignored.

Thus the preferred manner of calculating lift is based on Bernouilli's theorem, in that the differential pressure $\Delta P$ across the sphere is multiplied by the projected area A of the sphere and by a constant K determined by the velocity distribution across the sphere. Thus the lift force $F=KA(\Delta P)$, where $\Delta P$ is $$\frac{V_2{}^2 - V_1{}^2}{2g} \times .43$$

wherein $V_2$ is the highest velocity attained by the fluid passing the sphere, $V_1$ is the velocity of the fluid just upstream of the sphere, and $g$ is gravity.

The constant K is the ratio of the average velocity of the fluid flowing past the sphere to the maximum velocity attained, and for spheres the constant is just under ⅓. For ease of calculation, and to provide some safety factor, $K=\frac{1}{3}$ is used for spheres.

If sufficient information is available on the effect of fluid viscosity on the lift characteristics of the particular shape of the plug to be used, a more accurate determination of the lift force can be made by the equation $$F_L = C_L \frac{\rho}{2} A V_2{}^2$$

wherein $\rho$ is the mass density of the fluid, A is the projected area of the sphere, $V_2$ is the maximum velocity attained by the fluid flowing past the sphere, and $C_L$ is the lift coefficient of the body. For any body shape, the lift coefficient varies with variations in Reynold's Number, which of course is calculated from the density and viscosity of the fluid, the fluid velocity, and the pipe diameter.

The drag force $F_D$ is calculated from the equation $$F_D = C_D \frac{\rho}{2} A V_1{}^2$$

wherein $\rho$ is the mass density of the fluid, A is the projected area of the plug normal to the direction of fluid flow, $V_1$ is the velocity of the fluid just upstream of the plug, and $C_D$ is the drag coefficient. The drag coefficient of a body also varies with variations in Reynold's Number. Substantial data are available on the drag coefficient of various shapes, so this constant can usually be determined for the usual shapes used in pipeline plugs. Drag coefficients for spheres may be obtained from the article by E. Eisner, Das Widerstandproblem, Proc. Third Int. Cong. App. Mech. (Stockholm) 1931.

In addition to the drag force, the force of gravity, due to the effective weight of the sphere, must usually be considered in determining the force B of FIGURE 6. The effective weight is the actual weight of the sphere less the weight of the fluid displaced by it. This effective weight is then added to the drag force, in the embodiment shown in FIGURE 6, and force B is then calculated as the component of this total which is parallel to the direction in which the sphere is to move. Thus, $$B = (F_D + W) \sin a$$

where W is the effective weight of the sphere, and $a$ is the angle of the guide bars with the horizontal.

Similarly, force A is the component of the lift force $F_L$ which is parallel to the direction in which the sphere is to move. Thus in the embodiment shown in FIGURE 6, $$A = F_L \cos a$$

Where the guide bars are curved, as for example in the embodiment of FIGURES 1 and 2, the angle $a$ is the angle of the guide bars with the horizontal at the point of contact of the sphere with the guide bars when the sphere is in position to be moved out of the flow path. This angle is most advantageously about 30°, although it may be varied 5° or more and still obtain good results. If the direction of fluid flow is not vertical, then of course the drag force $F_D$ is not vertical and the lift force $F_L$ is not horizontal, and this must be compensated for by resolution of these forces into appropriate components.

It will now be evident that to determine the most desirable size for the enlarged section of the pipeline, an arbitrary size is selected, and calculations as hereinbefore described are made to determine the ratio of force B to force A. If this ratio is found to be less than about 1.75, or substantially greater than about 2.00, then another size is selected and the calculations repeated. Actually, good results are obtained with a ratio greater than 2.00, but use of unnecessarily large pipe sizes is uneconomical.

It is not clear just why it is necessary that a ratio of at least about 1.75 be used to insure separation of the sphere, but it is believed that at least in part such a large ratio is necessitated by the fact that the sphere sometimes rotates in the enlarged portion of the pipeline. If this rotation is counterclockwise, as viewed in FIGURES 2 and 6, the relative velocity of the fluid flowing past the sphere with respect to the surface of the sphere is increased, and therefore the lift force is increased beyond its theoretical value. Consequently it is necessary to insure that even the effect of this increased lift force is overcome by the forces tending to move the sphere out of the flow path.

Since the determination is dependent upon the characteristics of the fluid, the dimensions of the plug and the fluid velocity, this calculation must be made for each different installation, although the factors of safety inherent in the calculation allow for some variations in conditions without any major detrimental effect.

In meter prover apparatus, such as that shown in U.S. Patent No. 2,772,561 to Plank et al., and as disclosed in my aforesaid copending application Serial No. 195,502, a flexible, expansible sphere is preferably used to move through the pipeline forming the meter prover loop. The sphere is larger than the inner diameter of the pipeline by a small fraction of an inch, so that it forms a positive seal in the line and is carried along in the line at the velocity of the flowing fluid. After traversing the meter prover loop, the sphere is normally separated from the pipeline and moved into a by-pass line containing some valve means for stopping the movement of fluid and the sphere through the by-pass. This by-pass leads back to the beginning of the meter-prover loop. For ease of movement of the sphere, the by-pass line has been a downwardly-extending, preferably substantially vertical line, and has been slightly (about one pipe size) larger than the sphere, so that the sphere will move from the end of the meter prover loop back to the beginning by gravity alone.

According to the present invention the by-pass line is modified in that the upper end which intersects the end of the meter prover loop is other than vertical, and preferably is horizontal, or substantially horizontal. Furthermore, this upper end of the by-pass extends from a downwardly extending portion of the prover loop in a direction which is substantially in alignment with the main body of the prover loop, or at least is not misaligned more than a few degrees. In other words, the intersecting portion of the by-pass and the main body of the meter prover loop upstream thereof substantially form a U-bend. Thus trash carried through the meter prover loop is urged by centrifugal force to the outer perimeter of the U-bend, and moves on past the intersecting by-pass and into the downstream pipeline.

It will be appreciated that although the drawings illustrate a horizontal pipeline, a vertical enlarged portion therein, and a horizontal intersection of the by-pass line or plug exit passage, one or more of these may be varied somewhat, say up to about 30°, without greatly detracting from the efficiency of the apparatus of this invention.

Other modifications, such as in the cross-sectional shape of the enlarged portion of the pipeline, will be apparent to those skilled in the art, and therefore the invention is not limited to the specific embodiments shown and described, but only as defined by the claims, including equivalent structure. The claims are written in paragraph form to facilitate understanding but such form is not intended to be limiting in any manner.

I claim:
1. Apparatus comprising
   a pipeline having a substantially horizontal main body portion,
   a resilient sphere having a diameter substantially the same as the inside diameter of said main body portion and movable through said main body portion by a fluid flowing therethrough,
   a downwardly turned elbow on the downstream end of said main body portion,
   an enlarged cross-sectional area downwardly extending flow passage immediately downstream of the downwardly turned elbow,
   a sphere exit passage intersecting said enlarged flow passage, and
   sphere guide bars transversing said enlarged flow passage adjacent the downstream edge of said intersecting sphere exit passage and forming a ramp declining toward said sphere exit passage,
   the angle o fsaid ramp and the cross-sectional area of said enlarged flow passage being such that the forces acting on the sphere tending to move it into the sphere exit passage are at least about 1.75 times the force due to lift tending to prevent such movement, the latter force being the force due to lift created by the fluid flowing past the sphere when there is fluid flow through the enlarged flow passage and no fluid flow through the sphere exit passage.

2. Apparatus comprising
   a pipeline having a substantially horizontal main body portion.
   a resilient sphere having a diameter substantially the same as the inside diameter of said main body portion and movable through said main body portion by a fluid flowing therethrough,
   a downwardly turned elbow on the downstream end of said main body portion,
   an enlarged cross-sectional area downwardly extending flow passage immediately downstream of the downwardly turned elbow,
   a sphere exit passage intersecting said enlarged flow passage, and
   sphere guide bars transversing said enlarged flow passage adjacent the downstream edge of said intersecting sphere exit passage and forming a ramp declining toward said sphere exit passage,
   the angle of said ramp and the cross-sectional area of said enlarged flow passage being such that the ratio between force B and force A is at least 1.75 when fluid is flowing through the enlarged flow passage and no fluid is flowing through the sphere exit passage, force B being the component parallel to the ramp of the total of the effective weight of the sphere and the dynamic drag on the sphere, and force A being the component parallel to the ramp of the dynamic force on the sphere when the sphere is at rest on the ramp.

3. Apparatus as defined by claim 1 wherein, the enlarged flow passage is substantially vertical.

4. Apparatus as defined by claim 1 wherein the horizontal main body portion and the sphere exit passage substantially form a U-bend which includes said elbow and a part of said enlarged flow passage.

5. Apparatus as defined by claim 1 wherein the enlarged flow passage is substantially vertical and the horizontal main body portion and the sphere exit passage extend in substantially the same direction from the enlarged flow passage.

6. Apparatus comprising a pipeline having a substantially horizontal main body portion, a resilient sphere having a diameter substantially the same as the inside diameter of said main body portion and movable through said main body portion by fluid flowing therethrough, a downwardly turned elbow on the downstream end of said main body portion, a substantially vertical portion of said pipeline communicating with the downstream end of said elbow, one side of said vertical portion being aligned with the side of the elbow formed by the inner radius of said elbow and the other side of said vertical portion being displaced outwardly from the side of the elbow formed by the outer radius of said elbow, whereby the flow passage through said vertical portion is enlarged with respect to the flow passage through said main body portion, a sphere exit passage intersecting said vertical portion and extending therefrom in substantially the same direction as the main body portion, at least two sphere guide bars extending longitudinally downwardly within said vertical portion in alignment with the side of the elbow formed by the outer radius of the elbow and curving toward and intersecting said one side of said vertical portion immediately adjacent the lower edge of the intersecting sphere exit passage to form a ramp declining toward said sphere exit passage.

7. Apparatus comprising a substantially horizontal pipeline, a downwardly turned elbow on the downstream end of said horizontal pipeline, an enlarged cross-sectional area downwardly extending flow passage immediately downstream of the downwardly turned elbow, a plug exit passage interescting said enlarged flow passage and extending in substantially the same direction from the enlarged flow passage as the horizontal pipeline, and fluid permeable plug blocking means traversing said enlarged flow passage and sloping downwardly toward the downstream edge of said intersecting plug exit passage, the downwardly turned elbow being near enough to the plug exit passage so that any solid particles in a fluid flowing through said pipeline will be urged by centrifugal force to the side of the downwardly extending flow passage away from the plug exit passage.

8. Apparatus as defined by claim 7 wherein the enlarged flow passage is substantially vertical.

9. Apparatus comprising a pipeline having a main body portion, a plug member having a diameter substantially the same as the inside diameter of said main body portion and movable through said main body portion by fluid flowing therethrough, a downwardly turned elbow on the downstream end of said main body portion, a substantially vertical portion of said pipeline communicating with the downstream end of said elbow, one side of said vertical portion being aligned with the side of the elbow formed by the inner radius of said elbow and the other side of said vertical portion being displaced outwardly from the side of the elbow formed by the outer radius of said elbow, whereby the flow passage through said vertical portion is enlarged with respect ot the flow passage through said main body portion, a plug exit passage intersecting the one side of said vertical portion and extending therefrom, and fluid permeable plug blocking means traversing said vertical portion and sloping downwardly toward the downstream edge of said plug exit passage.

10. Apparatus comprising a pipeline having a main body portion, a plug member having a diameter substantially the same as the inside diameter of said main body portion and movable through said main body portion by fluid flowing therethrough, a downwardly turned elbow on the downstream end of said main body portion, an enlarged cross-sectional area downwardly extending section in said pipeline immediately downstream of said elbow, a plug exit passage intersecting said enlarged section, and fluid permeable plug blocking means traversing said enlarged section adjacent the downstream edge of said intersecting plug exit passage and forming a ramp declining toward said plug exit passage, the angle of said ramp and the cross-sectional area of said enlarged section being such that the forces acting on the plug tending to move it into the plug exit passage are at least about 1.75 times the force due to lift tending to prevent such movement, the latter force being the force due to lift created by the fluid flowing past the plug when there is fluid flow through the enlarged section and no fluid flow through the plug exit passage.

11. Apparatus as defined by claim 10 wherein said enlarged section is substantially vertical.

12. Apparatus comprising a substantially horizontal pipeline, a downwardly turned elbow on the downstream end of said horizontal pipeline, an enlarged cross-sectional area downwardly extending flow passage immediately downstream of the downwardly turned elbow, a plug exit passage intersecting said enlarged flow passage and extending in substantially the same direction from the enlarged flow passage as the horizontal pipeline, and fluid permeable plug blocking means traversing said enlarged flow passage and sloping downwardly toward the downstream edge of said intersecting plug exit passage, the downwardly turned elbow being near enough to the plug exit passage so that any solid particles in a fluid flowing through said pipeline will be urged by centrifugal force to the side of the downwardly extending flow passage away from the plug exit passage, and the angle of said ramp and the cross sectional area of said enlarged flow passage being such that the forces acting on the plug tending to move it into the plug exit passage area at least about 1.75 times the force due to lift tending to prevent such movement, the latter force being the force due to lift created by the fluid flowing past the plug when there is fluid flow through the enlarged flow passage and no fluid flow through the plug exit passage.

References Cited by the Examiner

UNITED STATES PATENTS

| | | | |
|---|---|---|---|
| 1,552,902 | 9/1925 | Werner | 210—446 X |
| 2,589,170 | 3/1952 | Ver Nooy | 15—104.06 |
| 2,801,644 | 8/1957 | Laswell | 15—104.06 |
| 3,063,080 | 11/1962 | Bergman et al. | 15—104.06 |

FOREIGN PATENTS

| | | |
|---|---|---|
| 22,409 | 9/1910 | Great Britain. |

ROBERT W. MICHELL, *Primary Examiner.*

WALTER A. SCHEEL, *Examiner.*